Patented June 11, 1935

2,004,873

UNITED STATES PATENT OFFICE

2,004,873

THIOSULPHATE ESTERS AND THEIR PRODUCTION

Alfred Kirstahler, Dusseldorf, and Wilhelm Jacob Kaiser, Dusseldorf-Benrath, Germany No Drawing. Application December 5, 1933, Serial No. 701,082. In Germany January 4, 1932

21 Claims. (Cl. 260—99.12)

It has been found that technically valuable high-molecular products may be obtained from the esters which consist, on the one hand, of unsubstituted or substituted, saturated or unsaturated, aliphatic, cycloaliphatic or aliphatic-aromatic compounds containing hydroxyl groups and having at least 6 carbon atoms, and on the other, of carboxylic acids containing reactive halogen atoms or the derivatives or substitution products of such acids.

The said valuable high-molecular compounds are obtained according to the present invention by converting the said esters with salts of thiosulphuric acid, this application being a continuation-in-part of our prior application Serial No. 648,725 filed December 23, 1932.

Of the hydroxyl compounds which are necessary for the synthesis of the esters employed for the conversion, the aliphatic alcohols containing 6 or more carbon atoms and having a saturated or unsaturated nature, also the naphthene alcohols and the resin alcohols have been found to be particularly suitable. The alcohols obtainable from paraffine, also aliphatic-aromatic alcohols, such as benzyl alcohol, beta-phenyl-ethyl alcohol and the like may be employed, likewise polyvalent alcohols. It is also possible, however, to employ other aliphatic compounds containing hydroxyl groups and having at least 6 carbon atoms, such as for example the saturated or unsaturated hydroxy fatty acids and their derivatives, such as esters and amines, and the hydroxyalkyl esters of fatty acids and the like, the hydroxyalkyl ethers or oxyalkyl thioethers of the higher alcohols and so on.

Of the acids which contain reactive halogen atoms and which are necessary for the synthesis of the said esters, the α-halogen fatty acids, such as monochloracetic acid, monobromsuccinic acid, dichloracetic acid, α-bromolauric acid have been found to be particularly suitable. Instead of such α-halogen acids, however, it is also possible to employ aliphatic carboxylic acids which are substituted by halogen in other positions, furthermore carboxylic acids of other series containing movable halogen atoms, such as for example benzyl chloride-4-carboxylic acid, 2-chlorobenzoic acid or its substitution products, such as for example 5-sulpho-2-chlorbenzoic acid.

The said esters are caused to react with the salts of thiosulphuric acid, for example sodium thiosulphate by heating to elevated temperatures, if desired in the presence or absence of diluents. Salts of thiosulphuric esters are thereby formed.

The water-soluble products manufactured according to the present invention possess saponaceous properties. They may be employed alone or together with other soaps, saponaceous substances, filling substances, compounds which give off active oxygen and the like.

Examples (1) 262 parts by weight of dodecyl chloracetic ester are heated with the same quantity of previously dried sodium thiosulphate for a considerable time at an elevated temperature. The reaction product is separated with benzene from excess of sodium thiosulphate and from the precipitated sodium chloride. The resulting sodium salt of the dodecyl glycollic ester thiosulphate, of the formula $C_{12}H_{25}.O.CO.CH_2.S.SO_3Na$, is a white crystalline mass which is readily soluble in water. The aqueous solution exhibits a high foam-producing power.

The compound may be employed with remarkable success, inter alia, in the cosmetic industry. If, for example, 7 parts of the new compound are mixed with a mixture of 28 parts of carragee mucilage (1:19) and 35 parts of pure glycerol while hot, and this mixture is stirred with 30 parts of precipitated calcium carbonate, an excellent toothpaste is obtained, which if desired may also be perfumed with oil of peppermint and menthol.

(2) 35 parts by weight of monochloracetic oleine ester are dissolved in 200 parts by volume of ethyl alcohol (95%) and to this solution 24 parts by weight of dehydrated sodium thio-sulphate are added. The mixture is treated for a longer time in a water bath on a reflux cooler. After a finishing treatment the thiosulphuric acid ester is obtained in the form of a thin wax-like mass, which can be redissolved from alcohol.

(3) 30 parts by weight of the chloracetyl compound of the monododecyl glycolether are dissolved in 100 parts by volume of ethyl alcohol (95%) whereupon 24 parts by weight of dehydrated sodium thiosulphate are added. The mixture is heated for a longer time in a water bath on a reflux cooler. After further treatment the thiosulphuric acid ester is obtained in the form of a colourless, wax-like mass, which can be redissolved from alcohol. The aqueous solution of the product shows a good foaming power.

(4) 38 parts by weight of the chlor-acetyl compound of a naphthene alcohol mixture (acetyl number of the naphthene alcohols=161) are dissolved in 175 parts by volume of ethyl alcohol (95%) and to this solution 24 parts by weight of dehydrated sodium thiosulphate are added. After prolonged treating the reaction product is worked down. The raw-product is a highly viscous, transparent mass.

Similar compounds are obtained by the reaction of chloracetic esters or similar halogenized esters of other high-molecular hydroxyl compounds or their mixtures, with thiosulphates.

We claim:

1. Process for the manufacture of high-molecular organic compounds, characterized in that the esters of, on the one hand, organic compounds of the group consisting of aliphatic, cycloaliphatic and aliphatic-aromatic compounds containing hydroxyl groups and having at least 6 carbon atoms, and, on the other, of carboxylic acids containing reactive halogen atoms, are treated with soluble salts of thiosulphuric acid.

2. Process for the manufacture of high-molecular organic compounds, characterized in that the esters of, on the one hand, organic compounds of the group consisting of aliphatic, cycloaliphatic and aliphatic-aromatic compounds containing hydroxyl groups and having at least 6 carbon atoms, and, on the other, of carboxylic acids containing reactive halogen atoms, are treated with sodium thiosulphate.

3. Process as claimed in claim 1, characterized in that the esters of aliphatic compounds containing hydroxyl groups and having at least 6 carbon atoms are used for the reaction.

4. Process as claimed in claim 2, characterized in that the esters of aliphatic compounds containing hydroxyl groups and having at least 6 carbon atoms are used for the reaction.

5. Process as claimed in claim 1, characterized in that the esters of hydroaromatic compounds containing hydroxyl groups and having at least 6 carbon atoms are used for the reaction.

6. Process as claimed in claim 2, characterized in that the esters of hydroaromatc compounds containing hydroxyl groups and having at least 6 carbon atoms are used for the reaction.

7. Process as claimed in claim 1, characterized in that the esters of aliphatic-aromatic compounds containing hydroxyl groups and having at least 6 carbon atoms are used for the reaction.

8. Process as claimed in claim 2, characterized in that the esters of aliphatic-aromatic compounds containing hydroxyl groups and having at least 6 carbon atoms are used for the reaction.

9. Process as claimed in claim 1, characterized in that the substituted esters of aliphatic compounds containing hydroxyl groups and having at least 6 carbon atoms are used for the reaction.

10. Process as claimed in claim 2, characterized in that the substituted esters of aliphatic compounds containing hydroxyl groups and having at least 6 carbon atoms are used for the reaction.

11. Process as claimed in claim 1, characterized in that the substituted esters of hydroaromatic compounds containing hydroxyl groups and having at least 6 carbon atoms are used for the reaction.

12. Process as claimed in claim 2, characterized in that the substituted esters of hydroaromatic compounds containing hydroxyl groups and having at least 6 carbon atoms are used for the reaction.

13. Process as claimed in claim 1, characterized in that the substituted esters of aliphatic-aromatic compounds containing hydroxyl groups and having at least 6 carbon atoms are used for the reaction.

14. Process as claimed in claim 2, characterized in that the substituted esters of aliphatic-aromatic compounds containing hydroxyl groups and having at least 6 carbon atoms are used for the reaction.

15. Process as claimed in claim 1, characterized in that the unsaturated esters of aliphatic compounds containing hydroxyl groups and having at least 6 carbon atoms are used for the reaction.

16. Process as claimed in claim 2, characterized in that the unsaturated esters of aliphatic compounds containing hydroxyl groups and having at least 6 carbon atoms are used for the reaction.

17. Process as claimed in claim 1, characterized in that the unsaturated esters of hydroaromatic compounds containing hydroxyl groups and having at least 6 carbon atoms are used for the reaction.

18. Process as claimed in claim 2, characterized in that the unsaturated esters of hydroaromatic compounds containing hydroxyl groups and having at least 6 carbon atoms are used for the reaction.

19. Process as claimed in claim 1, characterized in that the unsaturated esters of aliphatic-aromatic compounds containing hydroxyl groups and having at least 6 carbon atoms are used for the reaction.

20. Process as claimed in claim 2, characterized in that the unsaturated esters of aliphatic-aromatic compounds containing hydroxyl groups and having at least 6 carbon atoms are used for the reaction.

21. As new products high-molecular organic esters of the general formula $$R.O.CO.R'.S_2O_3Me$$

wherein R stands for a nonaromatic organic residue having at least 6 carbon atoms, R' for an organic residue and Me for an alkaline metal or for a radical of ammonium.

ALFRED KIRSTAHLER.
WILHELM JACOB KAISER.